United States Patent [19]

Anderson

[11] 3,922,522
[45] Nov. 25, 1975

[54] OPTICAL RECEIVER ASSEMBLY

[75] Inventor: Richard D. Anderson, Riverside, Calif.

[73] Assignee: The United States of America as represented by the Secretary of the Navy, Washington, D.C.

[22] Filed: Nov. 20, 1969

[21] Appl. No.: 886,606

Related U.S. Application Data

[63] Continuation-in-part of Ser. No. 510,457, Nov. 26, 1965, abandoned.

[52] U.S. Cl. ............... 250/216; 350/181; 350/190; 350/191
[51] Int. Cl.² ........................................ H01J 3/14
[58] Field of Search............ 350/181, 190, 191; 250/216; 102/70.2 P

[56] References Cited
UNITED STATES PATENTS

| | | | |
|---|---|---|---|
| 2,259,902 | 10/1941 | McCain | 350/191 |
| 2,961,925 | 11/1960 | Clark et al. | 102/70.2 X |
| 2,975,292 | 3/1961 | Anderson et al. | 250/216 |
| 3,251,266 | 5/1966 | Fuller | 350/190 |
| 3,331,721 | 7/1967 | Horst | 350/191 X |

Primary Examiner—Maynard R. Wilbur
Assistant Examiner—N. Moskowitz
Attorney, Agent, or Firm—R. S. Sciascia; G. J. Rubens; T. M. Phillips

[57] ABSTRACT

An optical receiver having a sensory pattern described by a thin cone of apex half-angle 90° (a disc). This is accomplished by means of a cylindrical lens curved in the direction of constant section with a radius equal to the focal length of the lens in the orthogonal plane. A detector is located at the focal point of the lens.

1 Claim, 6 Drawing Figures

RICHARD D. ANDERSON
INVENTOR.

BY
ATTORNEYS

OPTICAL RECEIVER ASSEMBLY

The invention herein described may be manufactured and used by or for the Government of the United States of America for governmental purposes without the payment of any royalties thereon or therefor.

This is a continuation-in-part of application Ser. No. 510,457, filed Nov. 26, 1965, and now abandoned.

The present invention relates to optical receivers and in particular to an optical receiver assembly for detecting visible and infrared electromagnetic radiation or the like.

In many instances it is desirable to provide an optical detector assembly that will occupy a small space and have a large energy collecting area as in guided missile fuzes. Previous to the present invention optical detector assemblies for the purpose of the detection of optical energy originating from sources in the field-of-view and incident on the receiver, used slit apertures and reflecting optical systems which were dictated by field-of-view requirements and the use of photoconductive detectors. The optical detector of the present invention overcomes the disadvantages of the previous detector assemblies by providing an optical receiver assembly that has a larger receiving aperture which permits the collection of more energy than prior devices of the same size.

It is an object of the invention, therefore, to provide a new and improved optical receiver assembly, for detecting visible and infrared electromagnetic radiation, that has a larger receiving aperture for collecting more energy than prior known receiver structures of the same size.

Other objects and many of the attendant advantages of this invention will become readily appreciated as the same becomes better understood by reference to the following detailed description when considered in connection with the accompanying drawings wherein.

Figure 1:
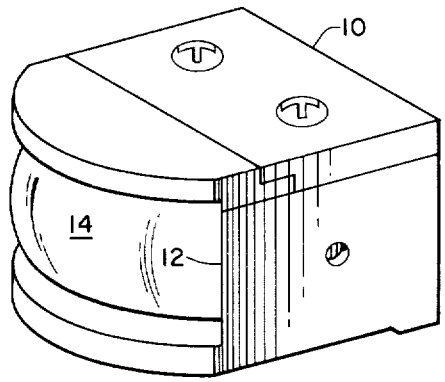
FIG. 1 is a perspective view of an embodiment of the invention.
Figure 2:
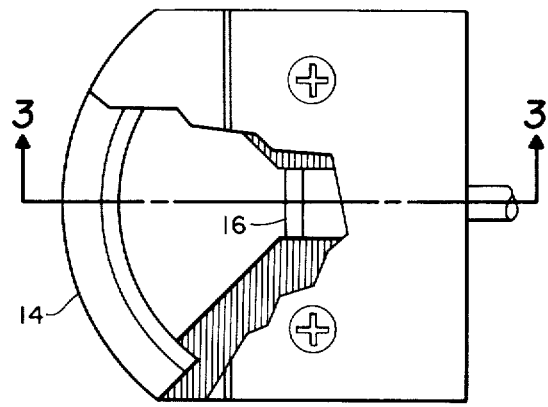
FIG. 2 is a top plan view of FIG. 1 with a portion shown in section. Such sections, as are taken in this plane, will be referred to as horizontal sections.
Figure 3:
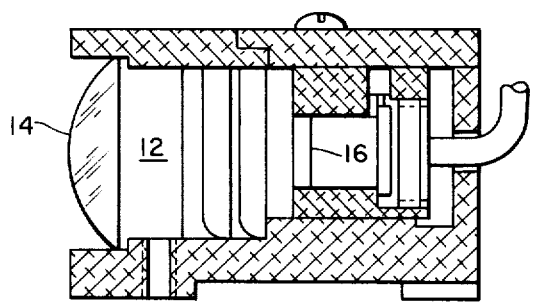
FIG. 3 is a cross-sectional view taken along lines 3—3 of FIG. 2. Such sections will be referred to as vertical sections.

Referring now to the drawings, like numerals refer to like parts in each of the figures, there is shown in FIGS. 1–3 a housing 10 having an aperture 12 for receiving in mating relation a cylinder lens 14. Aperture 12 extends into housing 10 a sufficient depth so that detector 16 may be mounted at the focal point of lens 14. Lens 14, being a cylinder, displays a positive focal length only in vertical sections, FIG. 3. The length of lens 14 as shown in horizontal sections, FIG. 2, has constant section and no optical power. Lens 14 is curved, FIG. 2, along its arc length with a radius equal to the focal length in the orthogonal (vertical) plane, FIG. 3. The length of the arc subtends an angle at the focal point equal to the azimuthal coverage of the field-of-view (sensory pattern) of $\pi/2$ or $2\pi/3$ radius which have been found satisfactory. Optical detector 16 is positioned at the focal point of lens 14 and forms a simple two dimensional energy collecting telescope in any vertical plane through the lens 14 and the center of the detector 16, orthogonal to the long dimension (arc length) of the lens 14. The detector dimension and lens focal length determine the beam width of the field-of-view exhibited in such planes. It is essential to understanding the operation of the device to notice that focusing occurs only in vertical sections or planes, such as FIG. 3. In horizontal planes, FIG. 2, no focusing occurs, hence the optics are not image forming. The embodiment of the invention shown in FIG. 1 has a field-of-view which is a sector of a disc of angular thickness defined by the beamwidth. This is a special case of a cone of 90° half angle. The similar embodiment shown in FIG. 4 has a field-of-view which is a sector of a cone of half angle 35° and thickness defined by the beamwidth.

Figure 4:
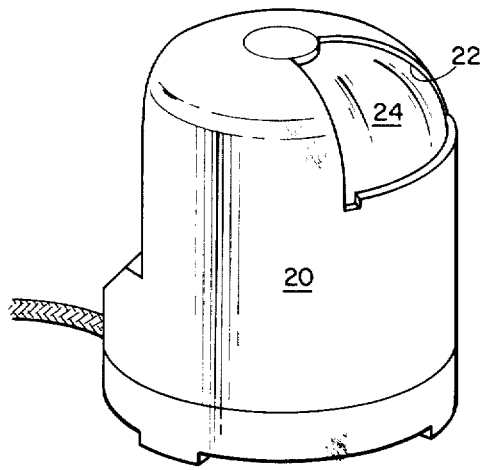
FIG. 4 is a perspective view of another embodiment of the invention.
Figure 5:
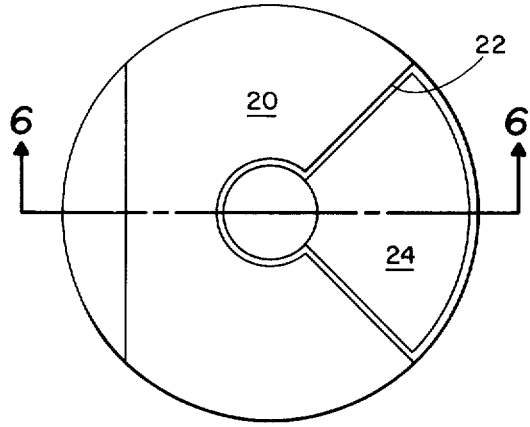
FIG. 5 is a top plan view of FIG. 4.
Figure 6:
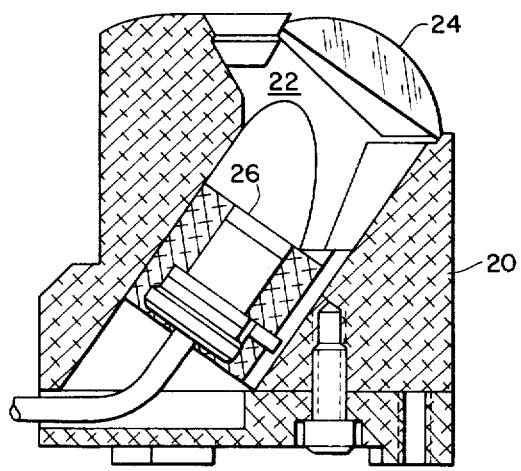
FIG. 6 is a cross-sectional view taken along lines 6—6 of FIG. 5.

Referring now to FIGS. 4–6 there is shown a housing 20 having an aperture 22 for receiving in mating relation a lens 24. Aperture 22 is of sufficient depth so that detector 26 may be mounted at the focal point of lens 24. As shown in FIG. 6, lens 24 is a converging cylindrical lens with a positive focal length. The length of lens 24 along an arc drawn from the axis of symmetry has constant section and no optical power. Lens 24 is curved, FIG. 4, along its arc length with a radius equal to the focal length in the orthogonal plane. The length of the arc subtends an angle at the focal point equal to the azimuthal coverage of the field-of-view (sensory pattern) of $\pi/2$ or $2\pi/3$ radians which have been found satisfactory. Optical detector 26 is located at the focal point of lens 24 and forms a simple two dimensional energy collecting telescope in any vertical plane containing the axis of symmetry and through the lens 24 and the center of the detector 26.

The two embodiments of the invention described above are in effect optical receivers having sensory patterns described by thin cones of apex half-angle 90° (a disc), FIG. 1, and 35°, FIG. 4. Energy incident on the lens 14, 24 is focused on the detector 16, 26 if the source is located in the defined optical beam width of the receiver. If the source is outside the beam width, the energy is focused off the detector 16, 26 and no output signal is produced.

The optical receiver assemblies may be fabricated of various materials, e.g., plastic, metals, ceramics, and by various processes. Lens 14, 24 may be made of a variety of refractive optical materials to permit it to survive environmental extremes and to allow operation in different regions of the spectrum, e.g., ultraviolet, visible, and infrared. Light baffles may be added to improve performance and the contained volume may be filled with various gases or evacuated. Optical detector 16, 26 may be of any suitable type and the assembly may be designed to cover greater or lesser fields-of-view at various conical angles.

What is claimed is:
1. An optical receiver assembly comprising:
   a. a single cylindrical lens curved in two dimensions to form a field of view that is a sector of a cone,
   b. a detector for detecting optical energy,
   c. a housing in which said lens and detector are mounted to form a simple two dimensional energy collecting telescope with beam width equal to said detector dimension divided by the focal length,
   d. the length of said lens having constant section with no optical power and being curved along its length with a radius equal to the focal length of the lens in the orthogonal plane, e. the field of view being a sector of a disc of angular thickness defined by the beam width and the length of said lens having constant section is curved along its path while retaining a radius from the detector equal to the focal length.

\* \* \* \* \*